UNITED STATES PATENT OFFICE.

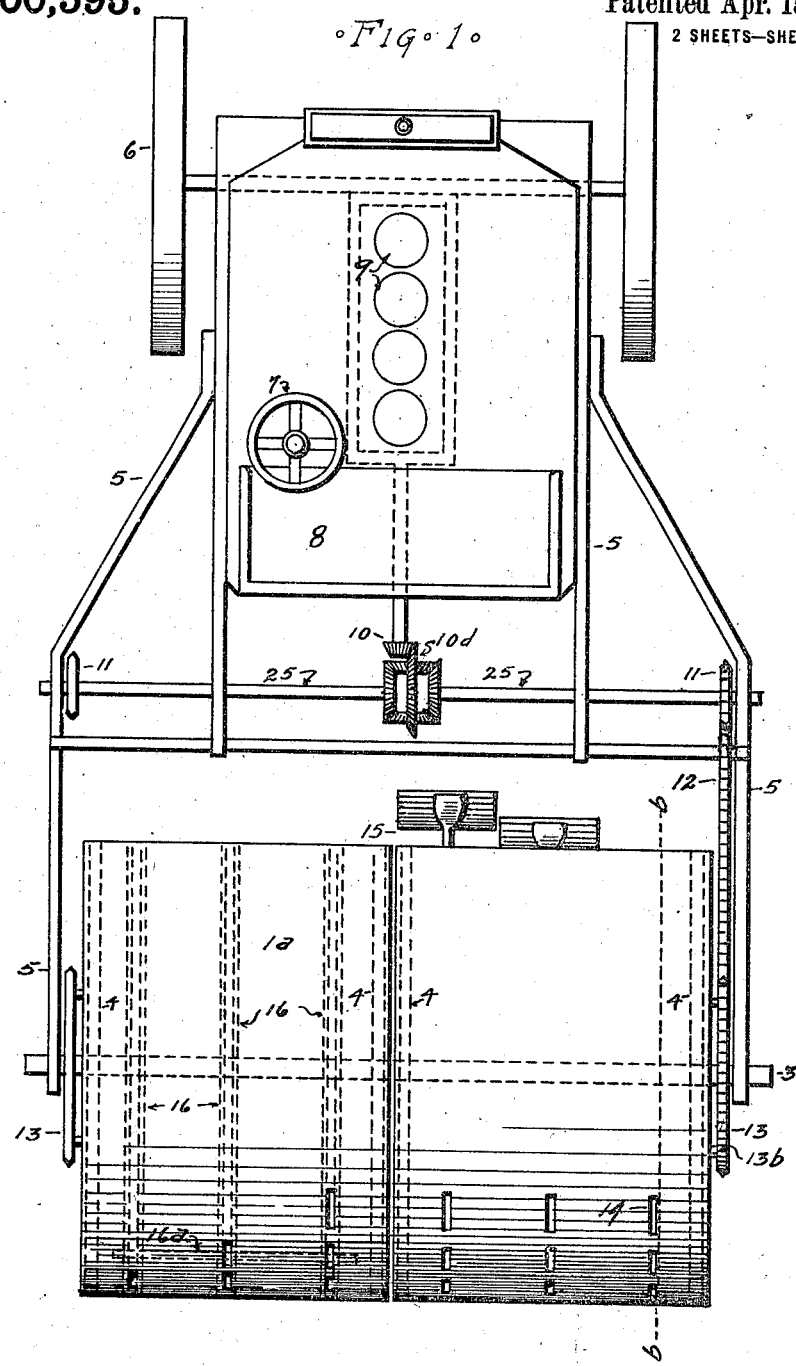

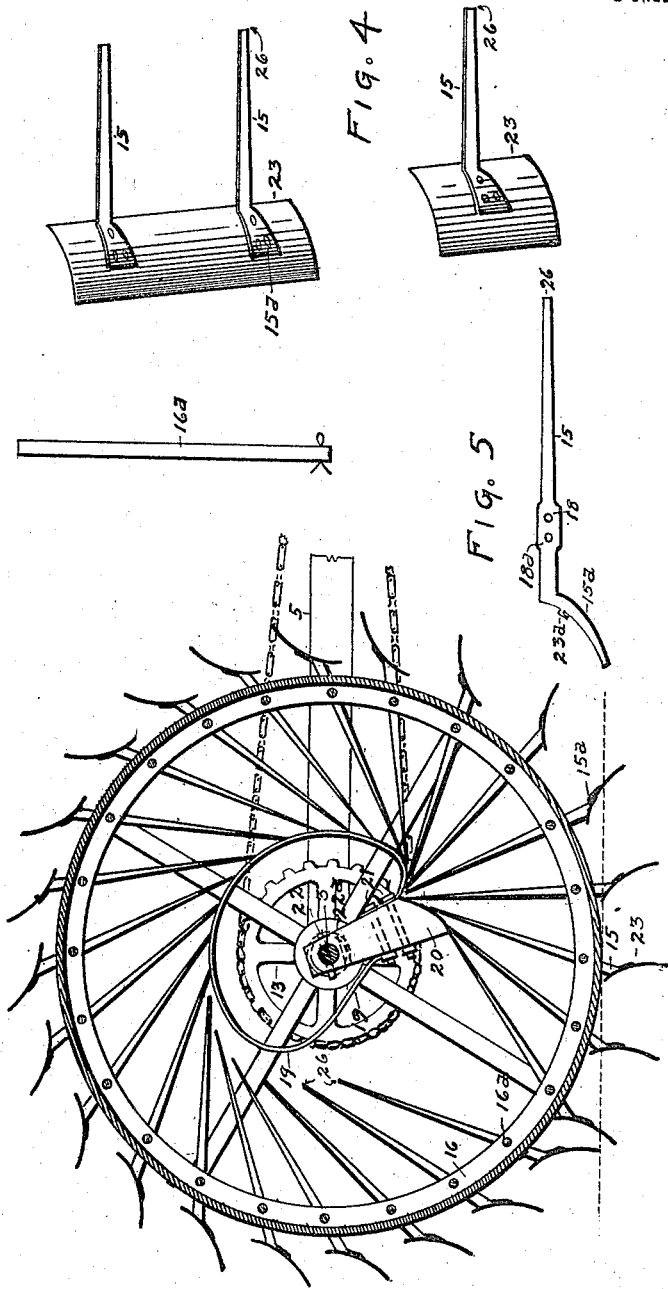

LEON FONNESBECK, OF LOGAN, UTAH.

ROTARY PLOW.

1,300,595.  Specification of Letters Patent.  Patented Apr. 15, 1919.

Application filed May 7, 1918. Serial No. 233,145.

*To all whom it may concern:*

Be it known that I, LEON FONNESBECK, a citizen of the United States, residing at Logan, in the county of Cache, State of Utah, have invented certain new and useful Improvements in Rotary Plows, of which the following is a specification.

This invention relates to rolling drum plows and has for its object the provision of an efficient rotary plow by which the ground will be effectively turned and pulverized preliminary to planting, and which may be driven by a motor mounted upon the same frame with the drum.

The primary object of this invention is to provide in a compact form a rolling drum plow in two duplicate rollers or sections which will effectually plow and turn the soil over as the drum rolls forward over the ground.

A further object is to provide a plow which will effectively and more practically utilize its own weight in cutting, digging and pulverizing the soil, and which will require less power to plow a given area of ground.

A further object is to provide a rotary plow which will more perfectly turn the ground over and deposit the top dressing of the soil at the bottom.

The invention further seeks to provide a plow capable of operation over a larger surface and at a higher speed of travel than the ordinary plow.

The several stated objects and such other objects as will incidentally appear from the following description are attained in an apparatus of the character illustrated in the accompanying drawings and the invention resides in certain novel features which will be particularly pointed out in the claims following the description.

In the drawings:

Figure 1 is a plan view of the complete machine.

Fig. 2 is a vertical cross section of the drum on line $b$—$b$ of Fig. 1.

Fig. 3 is a perspective view where two radiating plow-arm levers are attached to the same plow share.

Fig. 4 is a perspective view where only one plow-arm lever is attached to a share.

Fig. 5 is a side view of plow-arm lever.

Fig. 6 shows the shaft bolt on which the plow-arm levers are fulcrumed or hinged to the drum.

In putting my invention into practice I employ a drum which is in two duplicate rollers or sections 1 and 1$^a$, and a main frame 5 carried in advance of the drum in which the driving and steering elements are mounted for operating the machine. This frame, which may be of any preferred construction, is supported in front upon steering wheels 6 and in the rear upon stationary axle 3 which extends through the center of both sections of the drum and is supported and held in place by annular wheels 4 which revolve upon said axle 3 and are securely fitted and attached to the inner surface of each section of the drum at either end thereof.

The power whereby to operate the machine is derived from an internal combustion engine which may be of any well known type and is conventionally shown at 9. The power of the motor is applied to the drum by driving shaft 10 and differential gearing 10$^d$ which connects by transverse shafts 25, journaled on the frame, to small sprocket wheels 11, differentially driven, and over which pass sprocket chains 12 which at their rearward end pass over relatively larger sprocket wheels 13 which are mounted or bolted to the exterior annular wheels of each drum section. Thus each section of the drum is differentially and operatively connected to the motor similar to the drive wheels of a chain drive auto truck.

The drum is provided with suitable elongated slots or openings 14 in its cylindrical wall through which project plow-arm levers 15 which, by means of shaft bolt 16$^a$, are fulcrumed or hinged in the annular rings 16 which are provided in pairs inside the drum and attached thereto on either side of said slot openings 14. Thus it will be seen that the plow-arm levers are fulcrumed near their center in circular groups on the drum inside its periphery with the long arm of lever extending in and the short arm projecting out from the point of fulcrum 18.

Depending from stationary axle 3 and rigidly attached thereto I provide a stop or turning-iron 20, the bottom portion of which is so curved and shaped that it gradually increases its engagement with, and thus pushes forward, the interior ends 26 of plow-arm levers 15 as they pass under said turning-iron 20 as the drum rolls forward. Since plow-arm levers 15 are fulcrumed on the drum, it will readily be seen that pushing forward the interior end 26, when the point of fulcrum is on the ground, will push backward the exterior share end 15a of said plow-arm levers with reference to their points of fulcrum, and this backward movement of share ends 15a obtains while they are engaged in the ground. Thus, as the drum rolls forward, the exterior share ends 15a to which the plow shares are attached are forced into the ground by reason of the weight of the drum, and at the same time they are forced backward with reference to the point of fulcrum on the drum, by reason of the engagement of the interior ends 26 of the respective plow-arm levers with turning-iron 20, sufficiently to turn back and over the ground which has been cut.

The engaging portion of turning-iron 20 is so shaped and placed that when the exterior end of plow-arm levers have respectively moved back through the soil to a point where they are about to leave the ground, the respective interior ends 26 of said plow-arm levers pull away from and disengage said turning-iron 20; this allows the exterior ends, which are the heaviest, to drop to practically a perpendicular position which insures dumping of all dirt from the shares as they emerge from the ground, Fig. 2.

On account of the greater weight of the exterior ends of the plow-arm levers, when the shares are attached, the said plow-arms will naturally remain in this dumped position relative to the drum until it has moved to the top and starts down in front as the drum rolls over; to insure the plow-arm levers remaining in that position until they have moved down and are about to engage the ground again, I provide a curved spring 19 which is secured to the turning-iron 20 and which has a light gliding contact with interior ends 26 and thus prevents the exterior share ends from dropping forward or down, as will be readily understood.

When the exterior share end approaches near the ground (as the drum rolls over) spring 19 is so curved that it permits the plow-arms to come to a radiating position, at which point interior ends 26 of the plow-arm levers engage turning-iron 20. This engagement, as we have seen, pushes forward the interior ends of the said plow-arm levers in their respective consecutive order and consequently compel a corresponding rearward movement of the exterior share end of the said levers which are now engaged in the ground; and this rearward movement continues until the share has worked through the ground, at which time interior end 26 pulls away from turning-iron 20 and thus allows the share end to drop to a perpendicular position as has already been explained.

It will be understood that one or more plow-arm levers may be attached to the same share, as illustrated in Figs. 3 and 4, and that other forms than the curved rectangular share illustrated in the drawings may be used. In order to strengthen the bolt attachment of the share to the exterior curved portion 15a of the plow-arm levers, I provide an outwardly projecting hook or detent 23a adapted to shoulder and firmly engage the share 23.

The plow may be adjusted to cut various depths by moving turning-iron 20 farther up on axle 3 as indicated by hole 22a in turning-iron, Fig. 2; and at the same time moving plow-arm levers in a like distance by placing shaft bolt 16a through hole in said plow-arm levers instead of 18a. A series of corresponding holes may thus be provided in the turning-irons and plow-arm levers respectively, so that the plow may be regulated to cut any desired depth. While I have illustrated and described my invention in connection with a frame which carries the driving and steering elements, yet it is to be understood that the rotary plow herein described may also be pulled by a tractor or by horses, in which case the side frames of the drum are suitably connected and mounted on a pair of guide truck wheels in advance of the drum. When traveling along the road or from one field to another, suitable ground wheels raising the drum from the ground may be mounted on the projecting ends of axle 3.

It is understood that the plow herein described may be made of any desired size, and is not limited to any specific construction or arrangement of the parts except as specified in the claims.

The operation and utility of the machine is thought to be evident from the foregoing description taken in connection with the accompanying drawings. When the machine is set in motion the several turning-irons, corresponding with the several sets of plow-arm levers, engage and push forward the interior ends of the said levers as they pass under the said turning-iron and while the exterior share ends are engaged in the ground. As the machine advances over the field the several successive projecting plow-arm levers, on which the plow shares are attached, will take into the soil and by reason of their rearward movement while engaged in the ground will rapidly and effectively turn over the same. The machine is guided by manipulating steering column 7 as will be readily understood.

Having thus described the invention what is claimed as new is:

1. In a rotary plow, the combination of a drum, a plurality of radiating plow-arm levers projecting in circumferential rows through the drum and fulcrumed on transverse shafts, and intermediate annular rings secured to the inside of the drum on either side of said plow-arm levers and supporting said shafts.

2. In a rotary plow, the combination of a traction drum provided with a plurality of slots disposed in circular groups throughout the surface of the drum, annular rings secured to the inside of the drum on either side of each row of slots and, a plurality of radiating plow-arm levers projecting in circumferential rows through said slot openings respectively and fulcrumed on the inside of the drum by means of transverse shaft bolts which pass through holes in said plow-arm levers which register with similar holes in said annular rings inside the drum.

3. In a rolling drum plow, the combination of a hollow drum provided with slot openings in circular groups, a plurality of plow-arm levers projecting through the said slot openings and fulcrumed on the inside of the drum, a depending stop or turning-iron rigidly secured to the axle which engages and pushes forward the interior ends of said plow-arm levers as the machine moves forward, and a plurality of curved blades mounted on the exterior ends of said plow-arm levers respectively, curved rearward from the point of entering the soil so as to roll the top dressing over and under as it engages and passes into the ground in a downward and rearward movement.

4. In a rolling drum plow, the combination of a frame, a drum, a plurality of radiating plow-arm levers fulcrumed on the inside of the drum and projecting through the drum wall in circular groups, plow shares or blades mounted on the exterior ground ends of said levers, stops or turning-irons depending from stationary drum axle and rigidly secured thereto, one for each circular group of plow-arm levers, with which the interior ends of the said levers engage and are pushed forward, when the plow is in motion, and means attached to the turning-irons to hold or retain the plow-arm levers in this tripped position with reference to the drum until they are about to engage the ground again, and then gradually to allow the said levers to come to a radiating position and compel proper successive engagement with said turning irons.

In testimony whereof I hereunto subscribe my name in the presence of two witnesses.

LEON FONNESBECK.

Witnesses:
C. H. FLINDERS,
GEORGE C. JENSEN.

Copies of this patent may be obtained for five cents each, by addressing the "Commissioner of Patents, Washington, D. C."